(12) United States Patent
Kamiya

(10) Patent No.: US 9,768,660 B2
(45) Date of Patent: Sep. 19, 2017

(54) PURGE SYSTEM CAPABLE OF CONTROLLING FLOW RATE OF AIR

(71) Applicant: FANUC CORPORATION, Yamanashi (JP)

(72) Inventor: Youhei Kamiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 162 days.

(21) Appl. No.: 14/742,849

(22) Filed: Jun. 18, 2015

(65) Prior Publication Data

US 2015/0372567 A1 Dec. 24, 2015

(30) Foreign Application Priority Data

Jun. 23, 2014 (JP) ................. 2014-128568

(51) Int. Cl.
*H02K 5/10* (2006.01)

(52) U.S. Cl.
CPC ...................... *H02K 5/10* (2013.01)

(58) Field of Classification Search
CPC ........................................................ H02K 5/10
USPC .......................................................... 310/58
See application file for complete search history.

(56) References Cited

U.S. PATENT DOCUMENTS

2007/0079594 A1* 4/2007 Firey ................ F02C 3/28
60/39.464

2010/0232356 A1* 9/2010 Maheshwari ......... H04L 1/1867
370/328
2010/0262356 A1* 10/2010 Maruyama ............. B60K 6/365
701/103
2013/0300230 A1* 11/2013 Nakazawa ............... H02K 5/10
310/63

FOREIGN PATENT DOCUMENTS

JP 2009219313 A 9/2009
JP 2013-236473 A 11/2013
JP 2013230031 A 11/2013

OTHER PUBLICATIONS

English Abstract and machine translation for Japanese Publication No. 2013-236473 published Nov. 21, 2013, 18 pgs.
English Abstract and Machine Translation for Japanese Publication No. 2013-230031 A, published Nov. 7, 2013, 24 pgs.
English Abstract and Machine Translation for Japanese Publication No. 2009-219313 A, published Sep. 24, 2009, 11 pgs.

* cited by examiner

*Primary Examiner* — Terrance Kenerly
(74) *Attorney, Agent, or Firm* — Fredrikson & Byron, P.A.

(57) ABSTRACT

An air purge system includes an electric motor having an air purge device which supplies air to a space around the outer peripheral surface of an output shaft, an information acquisition unit which acquires operation information of the electric motor, and an air control unit, which controls the amount of air supplied from the air purge device in response to the acquired operation information. The air control unit increases the amount of the air supplied from the air purge device when the information acquisition unit acquires deceleration operation information of the electric motor.

5 Claims, 3 Drawing Sheets

PURGE SYSTEM CAPABLE OF CONTROLLING FLOW RATE OF AIR

BACKGROUND OF THE INVENTION

1. Field of the Invention

The present invention relates to an air purge system capable of controlling the flow rate of air supplied around an output shaft of an electric motor.

2. Description of the Related Art

As is known in the art, there is a device for preventing impurities from entering into an electric motor housing by supplying compressed air around an output shaft of an electric motor (for example, Japanese Laid-Open Patent Publication No. 2013-236473). In the device disclosed in Japanese Laid-Open Patent Publication No. 2013-236473, an air purge device is mounted at the end surface of the housing to exhaust compressed air supplied from the outside of the air purge device toward the outer peripheral surface of the output shaft of the electric motor via a fluid path of the air purge device.

The centrifugal force and pressure around the output shaft of the electric motor change according to the rotating state of the electric motor, resulting in a change in the easiness of intrusion of impurities into the housing. However, in the device disclosed in Japanese Laid-Open Patent Publication No. 2013-236473, since the compressed air is supplied regardless of the rotating state of the electric motor, the supply amount of compressed air may be excessive or insufficient.

SUMMARY OF INVENTION

An air purge system according to the present invention comprises an electric motor having a housing, an output shaft rotatably supported inside the housing, and an air purge device provided at an end portion of the housing to supply air to a space around the outer peripheral surface of the output shaft. The air purge system further comprises an information acquisition unit which acquires operation information of the electric motor, and an air control unit which controls the amount of air supplied from the air purge device in response to the operation information acquired by the information acquisition unit. The air control unit increases the amount of the air supplied from the air purge device when deceleration information corresponding to a deceleration operation of the electric motor is acquired by the information acquisition unit.

BRIEF DESCRIPTION OF THE DRAWINGS

The object, features, and advantages of the present invention will be further apparent from a description of the following embodiment associated with the accompanying drawings, and in the accompanying drawings.

DETAILED DESCRIPTION

Figure 1:
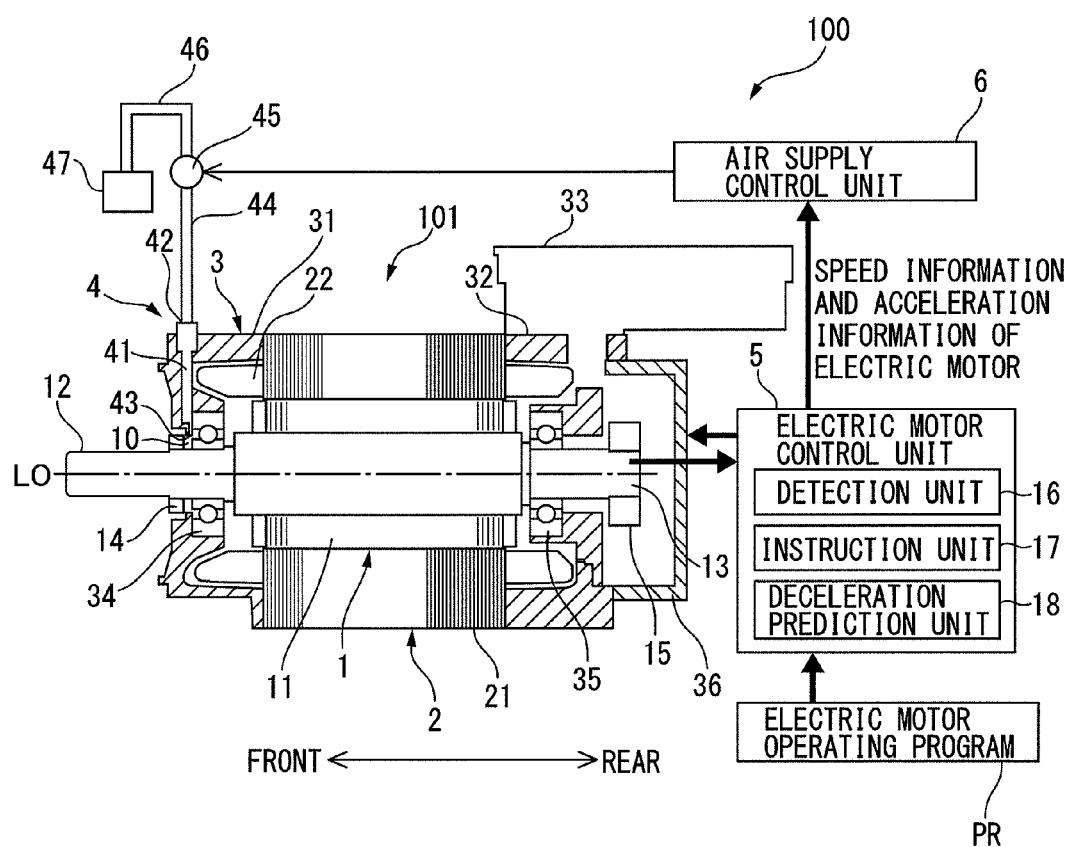
FIG. 1 is a view illustrating the overall configuration of an air purge system according to an embodiment of the present invention.

Hereinafter, an embodiment of the present invention will be described with reference to FIG. 1 to FIG. 3. FIG. 1 is a view illustrating a schematic configuration of an air purge system 100 according to an embodiment of the present invention. The air purge system 100 includes an electric motor 101. The electric motor 101, for example, is a three-phase induction electric motor which is used for driving a spindle of a machine tool.

As illustrated in FIG. 1, the electric motor 101 includes a rotor 1, a stator 2, a housing 3, and an air purge device 4. Hereinafter, the direction along the rotational axis L0 of the electric motor 101 illustrated in the drawing is defined as the front and rear direction for the purpose of convenience. In FIG. 1, the left corresponds to the front side, and the right corresponds to the rear side.

The rotor 1 has a rotor core 11 rotating about the rotational axis L0, and output shafts 12 and 13 integrally provided with the rotor core 11 and extending forward and backward along the rotational axis L0 from the front end surface and the rear end surface of the rotor core 11, respectively. A flinger 14 is provided at the front end portion of the output shaft 12, and an encoder 15 is provided at the rear end portion of the output shaft 13. In addition, although not illustrated in the drawing, a spindle of a machine tool is mounted at the front end portion of the output shaft 12 without a reduction gear.

The stator 2 has a cylindrical stator core 21 formed by stacking a plurality of electromagnetic steel sheets and a winding 22 wound around the inner peripheral surface of the stator core 21. The stator core 21 is disposed with a gap from the outer peripheral surface of the rotor core 11. The rotor core 11 rotates together with the output shafts 12 and 13 by a rotating magnetic field generated by a current supplied to the winding 22.

The housing 3 has a front housing 31 provided at the front end portion of the stator core 21 and a rear housing 32 provided at the rear end portion of the stator core 21. A terminal box 33 is provided on the outer peripheral surface of the rear housing 32. Bearings 34 and 35 are respectively provided between the inner peripheral surface of the front housing 31 and the outer peripheral surface of the output shaft 12 and between the inner peripheral surface of the rear housing 32 and the outer peripheral surface of the output shaft 13. The output shafts 12 and 13 are rotatably supported to the housing 3 via the bearings 34 and 35.

The air purge device 4 is configured to prevent impurities from entering into the electric motor 101. That is, since the machine tool electric motor 101 is used in the condition in which cleaning water, cutting oil, or the like scatter, impurities such as cleaning water and cutting oil may enter into the electric motor 101 via a gap between the output shaft 12 and the housing 3 (the front housing 31). In particular, when the spindle is directly coupled with the output shaft 12 of the electric motor 101 without the reduction gear, since the electric motor 101 is arranged near a machining area, impurities may easily enter into the electric motor 101. In order to prevent such a problem, for example, when a seal such as an oil seal is provided between the output shaft 12 and the housing 3, the seal may be worn by the high speed rotation of the rotor 1.

Therefore, in the present embodiment, the air purge device 4 is provided at the front end portion of the housing 31. The air purge device 4 supplies air to a gap 10 between the front housing 31 and the output shaft 12, that is, a space around the outer peripheral surface of the output shaft 12, thereby preventing intrusion of impurities into the electric motor 101. In addition, since the rear end portion of the electric motor 101 is covered with a cover 36, there is no intrusion of impurities from the side of the rear housing 32.

Accordingly, the electric motor 101 of the present embodiment has the air purge device 4 only at the front end portion of the front housing 31.

The air purge device 4 has an air fluid path 41 formed with a through-hole radially passing through the front end portion of the front housing 31. An air inlet 42 is provided at one end portion of the air fluid path 41 in the outer peripheral surface of the front housing 31, and an air outlet 43 is provided at the other end portion of the air fluid path 41 in the inner peripheral surface of the front housing 31. The air outlet 43 is positioned in front of the bearing 34 and at the rear of the flinger 14, and faces the outer peripheral surface of the output shaft 12.

A valve 45 is connected to the air inlet 42 via a pipeline 44, and an air tank 47 is connected to the valve 45 via a pipeline 46. Air is supplied to the air tank 47 by the driving of a pump (not illustrated), and high-pressure compressed air is accumulated in the air tank 47. The valve 45 is a variable valve, the opening of which can be varied by an electrical signal. The opening of the valve 45 is adjusted in order to be able to increase or decrease the supply amount of compressed air exhausted from the air outlet 43 (FIG. 2 and FIG. 3).

The driving of the electric motor 101 is controlled by an electric motor control unit 5. The opening of the valve 45 is controlled by an air supply control unit 6. The electric motor control unit 5 and the air supply control unit 6, for example, includes a calculation processing device including CPU (Central Processing Unit), RAM (Random Access Memory), ROM (Read Only Memory), or the like. The electric motor control unit 5 of the present embodiment serves as an information acquisition unit which acquires the operation information of the electric motor 101. The electric motor control unit 5 controls the driving of the electric motor 101 according to a predetermined electric motor operating program PR. The electric motor control unit 5 includes a detection unit 16. The detection unit 16 receives signals from the encoder 15, and acquires the speed information (an electric motor rotation speed) of the electric motor 101. Then, the detection unit 16 differentiates the speed of electric motor revolutions by time, thereby acquiring the acceleration information of the electric motor 101.

The air supply control unit 6 of the present embodiment serves as an air control unit, which controls the amount of air supplied from the air purge device 4. The air supply control unit 6 controls the opening of the valve 45 on the basis of the speed information and acceleration information of the electric motor 101 output from the electric motor control unit 5. FIG. 2 is a view illustrating the relation between the speed information (an electric motor rotation speed N) and the acceleration information (an electric motor acceleration A) of the electric motor 101 acquired from the signals from the encoder 15 and the supply amount G of air ejected from the air outlet 43.

Figure 2:
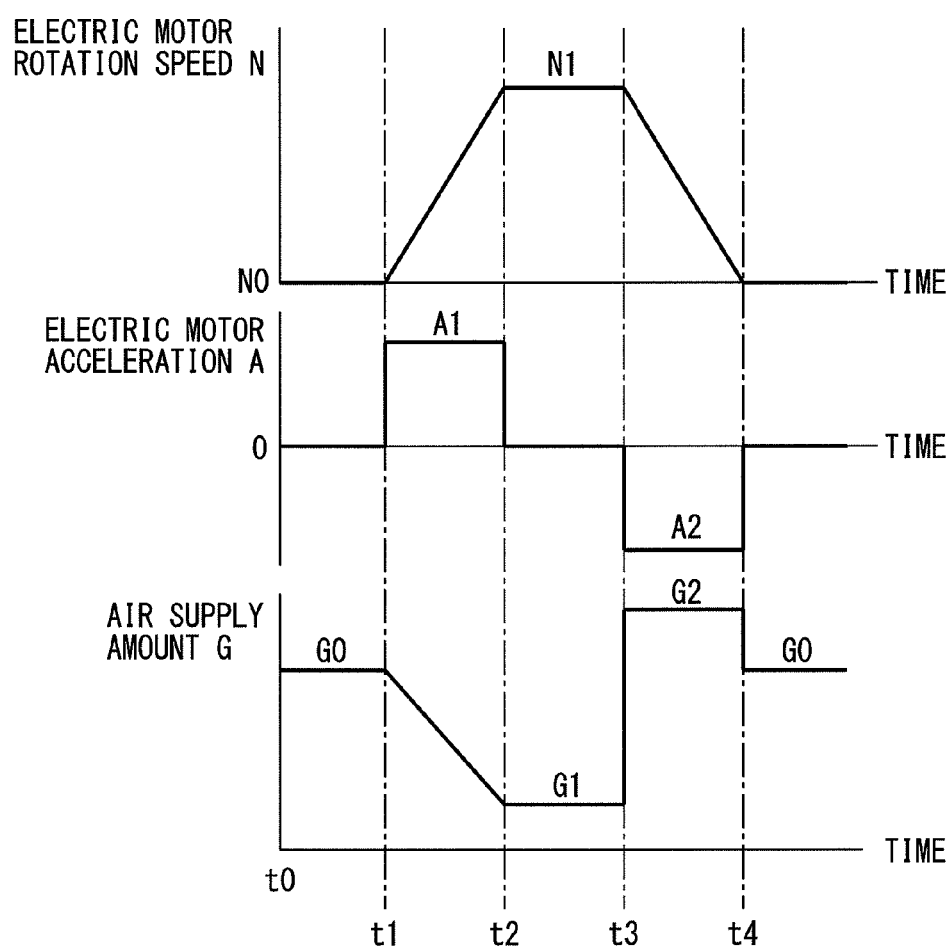
FIG. 2 is a view illustrating an example of the operation by the air purge system according to an embodiment of the present invention.

The rotation of the electric motor 101 is controlled by the electric motor control unit 5 as illustrated in FIG. 2. That is, the electric motor 101 stops (N=N0) in a period from a time point t0 to a time point t1, and is accelerated by a predetermined positive acceleration A1 in a period from the time point t1 to a time point t2. The electric motor 101 rotates by a constant rotation speed N1 in a period from the time point t2 to a time point t3, decelerates by a predetermined negative acceleration A2 (=−A1) in a period from the time point t3 to a time point t4, and stops again in a period after the time point t4 (N=N0).

At this time, the supply air control unit 6 controls the opening of the valve 45 so that the air supply amount is a predetermined reference amount G0 when the rotation stops (in the period from the time point t0 to the time point t1). When the rotation stops, since the surroundings of the output shaft 12 (the gap 10 or the like) are maintained at the atmospheric pressure, there is no operation of taking impurities into the housing 3. The reference amount G0 is decided in advance in consideration of this point.

On the other hand, when the electric motor 101 accelerates (the period from the time point t1 to the time point t2), a centrifugal force acting on the peripheral surface of the output shaft 12 increases as the electric motor rotation speed increases. Therefore, since the surroundings of the output shaft 12 are in negative pressure, but impurities around the output shaft 12 are discharged to an exterior (radially outside) by the centrifugal force, the intrusion of impurities into the housing 3 is difficult at the time of the acceleration as compared with the time of the stop. Furthermore, the intrusion of impurities into the housing 3 is suppressed as the centrifugal force becomes large. In consideration of this point, at the time of the acceleration, the air supply control unit 6 controls the opening of the valve 45 so that the air supply amount is reduced to be smaller than the reference amount G0 and is gradually reduced according to an increase in the electric motor rotation speed.

When the electric motor 101 rotates at a constant speed (the period from the time point t2 to the time point t3), the electric motor rotation speed is constant. In this period, the air supply control unit 6 controls the valve 45 so that the air supply amount G1 at the end of the acceleration is maintained. Consequently, when the electric motor 101 rotates at the constant speed, the air supply amount is reduced as the electric motor rotation speed increases. As described above, when the electric motor 101 accelerates (the period from the time point t1 to the time point t2) and when the electric motor 101 rotates at the constant speed (the period from the time point t2 to the time point t3), the air supply amount is reduced to be smaller than the reference amount G0, thereby it is possible to suppress the waste consumption of compressed air.

When the electric motor 101 decelerates (the period from the time point t3 to the time point t4), the centrifugal force acting on the peripheral surface of the output shaft 12 is reduced. At this time, after high-speed rotation of the electric motor 101, since the surroundings of the output shaft 12 are in negative pressure, impurities may be taken into the housing 3. In order to suppress such a problem, at the time of the deceleration, the air supply control unit 6 controls the opening of the valve 45 so that the air supply amount has a value larger than the reference amount G0 (a maximum air supply amount G2). In this way, it is possible to suppress the intrusion of impurities into the housing 3.

As described above, in the present embodiment, in consideration of the fact that the centrifugal force acting on the outer peripheral surface of the output shaft 12 and the pressure around the output shaft 12 change in response to the rotation of the electric motor 101 and thus the ease of the intrusion of impurities into the housing 3 changes, the air supply amount from the air outlet 43 is controlled in response to the rotation of the electric motor 101. That is, when the deceleration operation of the electric motor 101 is detected by the signals from the encoder 15, the air supply control unit 6 increases the opening of the valve 45, thereby increasing the amount of air supplied from the air purge device 4. By adopting this configuration, air for preventing the intrusion of impurities into the housing 3 can be supplied to the space around the output shaft 12 from the air purge device 4 without excess and deficiency, and therefore air can be efficiently supplied from the air purge device 4.

In other words, the air supply amount when the electric motor 101 stops, accelerates, and rotates at a constant speed is reduced to be smaller than the air supply amount G2 at the time of the deceleration. This control can significantly reduce the amount of air consumption as compared with the case in which a predetermined air amount (for example, the maximum air supply amount G2) is supplied from the air purge device 4 regardless of the rotating state of the electric motor 101. Furthermore, the air supply amount at the time of the deceleration is increased to be larger than the reference amount G0, and therefore it is possible to reliably suppress the intrusion of impurities into the housing 3 at the time of the deceleration as compared with the case in which a predetermined air amount (for example, the reference value G0) is supplied from the air purge device 4 regardless of the rotating state of the electric motor 101.

In addition, in the aforementioned embodiment, the deceleration operation of the electric motor 101 is detected by the signals from the encoder 15, and when the deceleration operation is detected, the amount of air supplied from the air purge device 4 is increased; however, the present invention is not limited thereto. For example, referring to FIG. 1, the electric motor control unit 5 includes an instruction unit 17. The instruction unit 17 instructs the operation of the electric motor 101 to the electric motor 101. When the deceleration operation of the electric motor 101 is instructed by the instruction unit 17, the air supply control unit 6 may increase the amount of air supplied from the air purge device 4. That is, an information acquisition unit for acquiring information on a current operation of the electric motor 101 may be the instruction unit 17 of the electric motor control unit 5 as well as the detection unit 16 for detecting signals from the encoder 15 or the like. Furthermore, the information acquisition unit may have any configuration as long as it acquires at least deceleration information from among the deceleration information corresponding to the deceleration operation of the electric motor 101, stop information corresponding to the stop operation of the electric motor 101, acceleration information corresponding to the acceleration operation of the electric motor 101, and constant rotation information corresponding to the constant speed rotation operation of the electric motor 101. Furthermore, when the signs (plus or minus) of a detected speed value and a detected acceleration value are different from each other or when the signs (plus or minus) of a speed instruction and an acceleration instruction are different from each other, the deceleration information may be acquired.

Referring to FIG. 1, the electric motor control unit 5 of the present embodiment includes a deceleration prediction unit 18 which predicts a deceleration start time point of the electric motor 101 with reference to an electric motor operating program PR. The air supply control unit 6 may increase the amount of air supplied from the air purge device 4 by using the deceleration start point predicted by the deceleration prediction unit 18. That is, the information acquisition unit may include the deceleration prediction unit 18. FIG. 3 is a view illustrating the relation among electric motor rotation speeds N, the electric motor acceleration A, and the air supply amount G in this case. In addition, in the present embodiment, the electric motor control unit 5 includes the deceleration prediction unit 18, however, the present invention is not limited thereto and the air supply control unit 6 may include the deceleration prediction unit.

Figure 3:
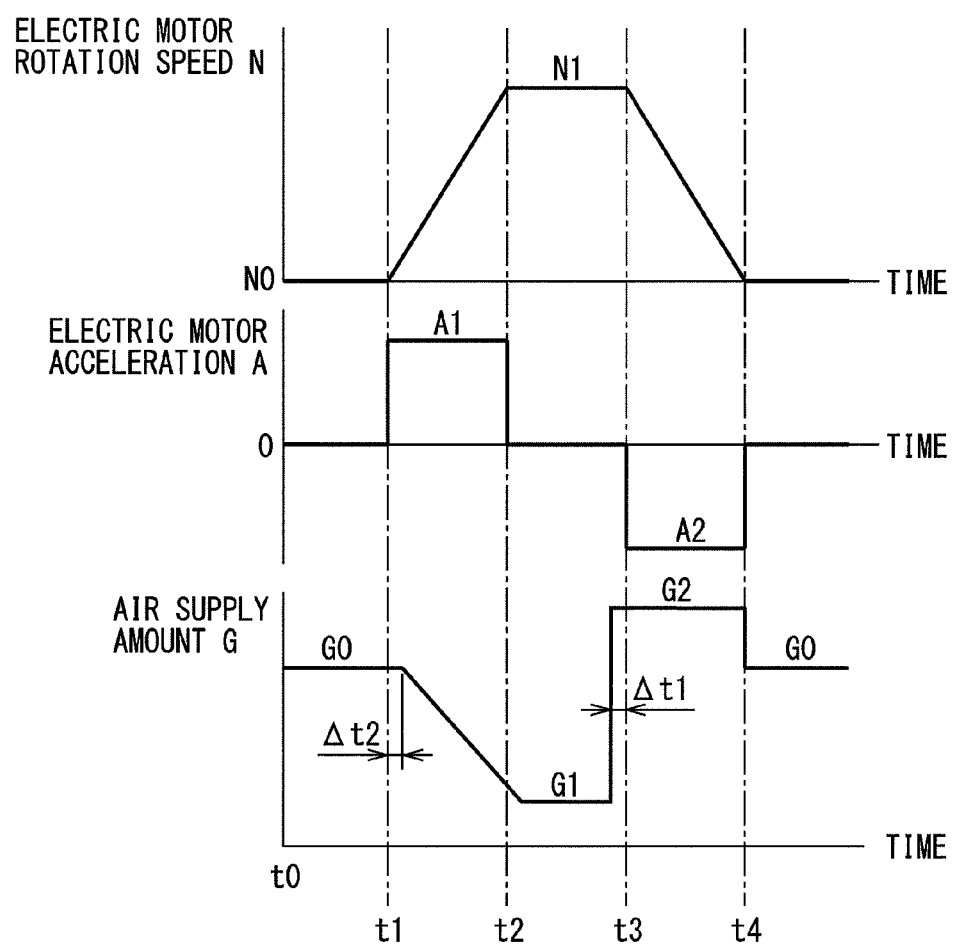
FIG. 3 is a view illustrating another example of the operation by the air purge system according to an embodiment of the present invention.

In FIG. 3, the deceleration start point t3 is predicted based on the electric motor operating program PR. The amount of air supplied from the air purge device 4 is increased before a predetermined time Δt1 from the deceleration start point t3. By adopting this configuration, it is possible to increase the amount of air supplied from the air purge device 4 without delay, thereby it is possible to reliably suppress the intrusion of impurities at the time of the deceleration.

In addition, in FIG. 3, the acceleration start point t1 is predicted based on the electric motor operating program PR, and the amount of air supplied from the air purge device 4 is reduced after a predetermined time Δt2 from the acceleration start point t1. By adopting this configuration, the air supply amount is reduced after the acceleration operation of the electric motor 101 is started, and therefore it is also possible to suppress the intrusion of impurities at the time of the acceleration.

In the aforementioned embodiment, the air supply control unit 6 controls the opening of the valve 45 so that the air supply amount at the time of the deceleration of the electric motor 101 is increased to be larger than the air supply amounts at the time of the stop, the acceleration, and the constant speed rotation. The configuration of the air control unit is not limited thereto, and the air control unit may have any structure as long as it increases at least the air supply amount at the time of the deceleration to be larger than the air supply amount at the time of the constant speed rotation. For example, the air supply amounts at the time of the acceleration and the constant speed rotation may also be controlled to predetermined values (for example, G0), respectively. Furthermore, the air supply amounts may also be controlled by rotation control of a pump without using the valve 45.

Although the air purge system 100 of the aforementioned embodiment is applied to a machine tool, the air purge system 100 of the present invention can be applied to devices other than the machine tool in a similar manner. Consequently, it can be used in order to suppress the intrusion of other impurities such as dust as well as cutting oil.

The air purge system of the present invention increases the amount of air supplied from the air purge device when the electric motor decelerates so that it is possible to supply compressed air around the output shaft without excess and deficiency.

The above description is merely an example, and the present invention is not limited to the aforementioned embodiments and modifications as long as they do not impair the features of the present invention. Elements of the embodiments and the modifications include elements which can be replaced and are apparently replaced while maintaining the identification of the present invention. In other words, other embodiments considered within the technical scope of the present invention are included in the scope of the present invention. Furthermore, the above embodiments and one or more of the modifications can also be arbitrarily combined.

The invention claimed is:
1. An air purges system comprising:
an electric motor having a housing, an output shaft rotatably supported inside the housing, and an air purge device provided at an end portion of the housing to supply air to a space around an outer peripheral surface of the output shaft;
an information acquisition unit which acquires operation information of the electric motor; and an air control unit which controls an amount of air supplied from the air purge device in response to the operation information acquired by the information acquisition unit, wherein the air control unit increases the amount of the air supplied from the air purge device when deceleration information corresponding to a deceleration operation of the electric motor is acquired by the information acquisition unit.

2. The air purge system according to claim 1, wherein the information acquisition unit includes a detection unit which detects a rotation speed of the electric motor, and the air control unit increases the amount of the air supplied from the air purge device when the deceleration operation of the electric motor is detected by the detection unit.

3. The air purge system according to claim 1, wherein the information acquisition unit includes an instruction unit which instructs an operation of the electric motor, and the air control unit increases the amount of the air supplied from the air purge device when the deceleration operation of the electric motor is instructed by the instruction unit.

4. The air purge system according to claim 1, wherein the information acquisition unit includes a deceleration prediction unit which predicts a deceleration start time point of the electric motor with reference to a predetermined operating program for controlling an operation of the electric motor, and the air control unit increases the amount of the air supplied from the air purge device before a predetermined time from the deceleration start time point predicted by the deceleration prediction unit.

5. The air purge system according to claim 1, wherein the information acquisition unit further acquires stop information, acceleration information and constant rotation information respectively corresponding to a stopped operation, an acceleration operation and a constant speed rotation operation of the electric motor, and when the deceleration information is acquired by the information acquisition unit, the air control unit increases the amount of the air supplied from the air purge device to be larger than the air amount when the stop information, the acceleration information, or the constant rotation information is detected.

* * * * *